(12) United States Patent
Emerson

(10) Patent No.: US 7,497,461 B2
(45) Date of Patent: Mar. 3, 2009

(54) MULTI-USE CONVERTIBLE INFANT CARRYING DEVICE

(76) Inventor: Anthony G. Emerson, 1739 S. Avington Ave., West Covina, CA (US) 91792

( * ) Notice: Subject to any disclaimer, the term of this patent is extended or adjusted under 35 U.S.C. 154(b) by 295 days.

(21) Appl. No.: 11/633,775

(22) Filed: Dec. 4, 2006

(65) Prior Publication Data

US 2008/0129001 A1 Jun. 5, 2008

(51) Int. Cl.
*B62B 7/08* (2006.01)
(52) U.S. Cl. .................. 280/642; 280/647; 280/42; 280/650; 280/658
(58) Field of Classification Search ............ 280/642, 280/647, 650, 657, 42, 643, 47.38
See application file for complete search history.

(56) References Cited

U.S. PATENT DOCUMENTS

| | | | |
|---|---|---|---|
| 2,907,372 A | 10/1959 | Leger | |
| 3,079,162 A | 2/1963 | Michels, Jr. | |
| 3,248,125 A | 4/1966 | Gill | |
| 3,627,342 A * | 12/1971 | Morellet | 280/649 |
| 3,961,803 A * | 6/1976 | Fleischer | 280/642 |
| 3,967,833 A * | 7/1976 | Fleischer | 280/639 |
| 4,032,173 A * | 6/1977 | Clegg | 280/650 |
| 4,113,306 A | 9/1978 | von Wimmersperg | |
| 4,181,356 A | 1/1980 | Fleischer | |
| D254,610 S | 4/1980 | Kassal | |
| 4,220,351 A | 9/1980 | Fleischer | |
| 4,231,587 A | 11/1980 | Fleischer | |
| 4,239,259 A * | 12/1980 | Martinez | 280/649 |
| 4,256,325 A | 3/1981 | Fleischer | |
| 4,412,688 A * | 11/1983 | Giordani | 280/642 |
| 4,620,711 A | 11/1986 | Dick | |
| 4,681,340 A * | 7/1987 | Pasquini | 280/642 |
| 4,762,256 A | 8/1988 | Whitaker | |
| 4,844,504 A * | 7/1989 | Bigo | 280/642 |
| 4,892,327 A * | 1/1990 | Cabagnero | 280/650 |
| 5,230,523 A | 7/1993 | Wilhelm | |
| D345,720 S | 4/1994 | Pohl | |
| 5,333,769 A | 8/1994 | Skroski | |
| 5,398,951 A | 3/1995 | Ryu | |
| D358,058 S | 5/1995 | Anthony | |
| 5,411,729 A | 5/1995 | Magid | |
| 5,431,478 A | 7/1995 | Noonan | |
| 5,468,009 A * | 11/1995 | Eyman et al. | 280/650 |
| 5,478,096 A | 12/1995 | Ting | |
| D365,925 S | 1/1996 | Roan | |
| 5,662,339 A | 9/1997 | Svendsen | |
| 5,806,924 A | 9/1998 | Gonas | |
| 5,829,826 A * | 11/1998 | Ziccardi | 297/118 |
| D402,235 S | 12/1998 | Haut | |
| 5,964,470 A | 10/1999 | Svendsen | |
| 5,987,665 A | 11/1999 | Simantob | |
| 6,045,145 A * | 4/2000 | Lan | 280/47.38 |
| 6,231,056 B1 | 5/2001 | Wu | |
| 6,250,654 B1 | 6/2001 | Willis | |

(Continued)

*Primary Examiner*—Christopher P Ellis
*Assistant Examiner*—Bridget Avery
(74) *Attorney, Agent, or Firm*—Sandy Lipkin

(57) ABSTRACT

An apparatus that is a multi-purpose device that provides the caretaker of an infant a mobile, collapsible frame that can convert to a stroller, a walker, a high chair, a carrier, a bassinet and a backpack and that can accommodate the placement of car seats made by third party manufacturers.

10 Claims, 12 Drawing Sheets

U.S. PATENT DOCUMENTS

| | | | |
|---|---|---|---|
| 6,375,213 B1 * | 4/2002 | Suzuki | 280/649 |
| 6,811,178 B2 * | 11/2004 | Tomasi et al. | 280/650 |
| 6,910,696 B2 | 6/2005 | Bargery | |
| D508,443 S | 8/2005 | Sanchez | |
| 2003/0192925 A1 | 10/2003 | Boone | |
| 2005/0072821 A1 | 4/2005 | Shaw | |

* cited by examiner

MULTI-USE CONVERTIBLE INFANT CARRYING DEVICE

BACKGROUND OF THE INVENTION

1. Field of the Invention

The present invention relates generally to the field of infant products and more particularly to a novel device that is collapsible and mobile that can be converted into a stroller, a walker, a high chair, a carrier, a bassinet, and a backpack and that can also accommodate the infant car seats of third party manufacturers.

2. Description of the Prior Art

The field of multi-purpose infant products is a relatively crowded one. The advantages of having one device perform more than one function include the versatility involved, the space saving features and quite significantly, the cost savings. When providing necessities for babies, both space and funds can quickly be consumed.

Many of the devices found in the prior art related to combination infant products is bulky and limited to a relatively few number of uses. When a busy mobile parent or infant caretaker takes an infant on outings, to daycare or to visit relatives, many devices are desired to accommodate the infant's needs. These devices include: an infant car seat to keep the infant secure while driving, a stroller to walk the infant once at the destination, a walker to allow the infant to exercise his legs and find his way about, a high chair to feed the infant, a carrier to carry the baby into smaller spaces such as a restaurant, a bassinet in which the baby can nap and a backpack that holds the collapsed frame of the device, which can be attached to the back of the caretaker while carrying the baby by hand in the infant carrier for convenient and comfortable walking.

However, there is a major drawback to having to transport all of these devices, i.e., the amount of space required and the cumbersome aspects of moving the devices from the transport vehicle to the final destination. In the past, many combinations of various baby features have been utilized, with mixed results.

Some of these combinations include combination car seats and baby strollers (See U.S. Pat. No. DES345,720 to Pohl, U.S. Pat. No. DES358,058 to Anthony et al., U.S. Pat. No. DES402,235 to Haut, U.S. Pat. No. DES508,443 to Sanchez, U.S. Pat. No. 4,113,306 to von Wimmersperg, U.S. Pat. No. 4,762,256 to Whitaker, U.S. Pat. No. 5,230,523 to Wilhelm, U.S. Pat. No. 5,398,951 to Ryu, U.S. Pat. No. 5,662,339 to Svendsen et al., and U.S. Pat. No. 5,964,470 to Syendsen).

Other combinations have included a baby carrier/backpack combination (See U.S. Pat. No. DES365,925 to Roan), a scooter/walker/stroller (See U.S. Pat. No. 2,907,372 to Leger), a stroller/walker/carriage (See U.S. Pat. No. 3,079, 162), a sleeper/walker/stroller (See U.S. Pat. No. 3,248,125 to Gill), a carrier/stroller/backpack/car seat (See U.S. Pat. No. 4,620,711 to Dick), a face-to-face carrier/diaper bag/changing surface/portable crib (See U.S. Pat. No. 5,333,769 to Skroski), a backpack/stroller, car seat/bed, chair (See U.S. Pat. No. 5,431,478 to Noonan), a dining chair/car seat/cradle/bed (See U.S. Pat. No. 5,478,096 to Ting), a bed/carrier/rocker (See U.S. Pat. No. 5,987,665 to Simantob et. al), a car seat/stroller/swing (See U.S. Pat. No. 6,250,654 to Willis), a car seat/rocker/stroller (See U.S. Pat. No. 6,910,696 to Bargery et. al), and a car seat/stroller/backpack (See U.S. Pat. App. US2003/0192925 to Boone).

None of the prior art provides the utility of combining the ability to load third party manufacturer car seats, plus the ability to collapse the device for storage and transport and having the ability to transport a stroller, a walker, a high chair, a carrier, a bassinet, and a backpack. By providing all of these devices in one, not only is the infant caretaker experiencing heightened convenience, but both space and money are conserved.

Accordingly, it is the objective of the present invention to overcome the shortcomings of the prior art and provide a multi-use baby device that saves both space and money while still providing the caretaker of the infant the versatility to fully accommodate the needs of the infant both at home and while traveling.

SUMMARY OF THE INVENTION

The preferred embodiment of the present invention teaches a multi-purpose collapsible infant device comprising a horizontal rear support member connecting a first wheel and a second wheel, a handle, a first rear member extending downward in a substantially vertical orientation from the handle and attaching to the rear support member, a second rear member extending downward in a substantially vertical orientation from the handle and attaching to the rear support member wherein the second rear member is substantially parallel to the first rear member, a first front member extending downward at an angled orientation from the handle and having a bottom portion that bends to a position substantially perpendicular to the ground, the bottom portion of the first front member being attached to a third wheel, the first front member having a collapsible joint located between the handle and the bottom portion, a second front member extending downward at an angled orientation from the handle and having a bottom portion that bends to a position substantially perpendicular to the ground, the bottom portion of the second front member being attached to a fourth wheel, the second side member having a collapsible joint located between the handle and the bottom portion, the second front member being substantially parallel to the first front member, a first side support member positioned substantially parallel to the ground that connects the first rear member to the first front member, a second side support member positioned substantially parallel to the ground that connects the second rear member to the second front member, and a central receiving piece that releasably receives optional attachments, the central receiving piece having a first side and a second side, the first side and the second sides being connected through a bottom portion, the first side and the second side positioned substantially perpendicular to the bottom portion, the central receiving piece being movable in an up and down direction along the first front member and the second front member.

The infant device is foldable at the collapsible joints on the first front member and the second front member to a position wherein the portion of the first front member between the collapsible joint on the first front member and the handle and the portion of the second front member between the collapsible joint on the second front member and the handle lay flush against the portion of the first front member between the collapsible joint on the first front member and the bottom portion of the first front member and the portion of the second front member between the collapsible joint on the second front member and the bottom portion of the second front member.

Yet another embodiment of the invention modifies the above embodiment by further defining that a latch secures the device when in a collapsed position, the latch being located near the handle.

Yet another embodiment of the invention modifies the above embodiment by further defining that the central receiving piece securely holds in place an infant seat, the infant seat further comprising an outer frame that releasably fits into the central receiving piece, a securing means to secure an infant in the infant seat, a back rest, a seat, a cushioning means on the back rest, and a cushioning means on the seat.

Yet another embodiment of the invention modifies the above embodiment by further defining that the infant seat has a carrying handle, thereby allowing the infant seat to be used as an infant carrier when removed from the central receiving piece.

Yet another embodiment of the invention modifies the above embodiment by further defining that the device is converted into a backpack wherein the infant carrier is removed from the frame of the device for carrying and while the device is in a collapsed position, the backpack further comprising an attaching means for attachment to the frame of the device when the device is in the collapsed position, adjustable straps that are attached to the attaching means, and a soft padding material placed between the adjustable straps and the attaching means.

Yet another embodiment of the invention modifies the above embodiment by further defining that the backpack carries the infant carrier rather than the collapsible device.

Yet another embodiment of the invention modifies the above embodiment by further defining that the cushioning means on the infant seat is modifiable to reveal a first opening and second opening for the legs of the infant to enter thereby utilizing the device as a walker.

Yet another embodiment of the invention modifies the above embodiment by further defining that an adjustable subframe is securely attached to the central receiving piece, the subframe further comprising a substantially rectangular outside frame, a first side attachment means for attachment to the first side of the central receiving piece, and a second attachment means for attachment to the second side of the central receiving piece.

Yet another embodiment of the invention modifies the above embodiment by further defining that a bassinet is securely attachable to the subframe.

Yet another embodiment of the invention modifies the above embodiment by further defining that the first rear member and the second rear member are movable to attach to the first front member and second front member at a position that places the device at a reduced angle relative to the ground wherein the infant seat can be positioned to provide a preferred angle to be used as a high chair.

DETAILED DESCRIPTION OF A PREFERRED EMBODIMENT

Figure 1:
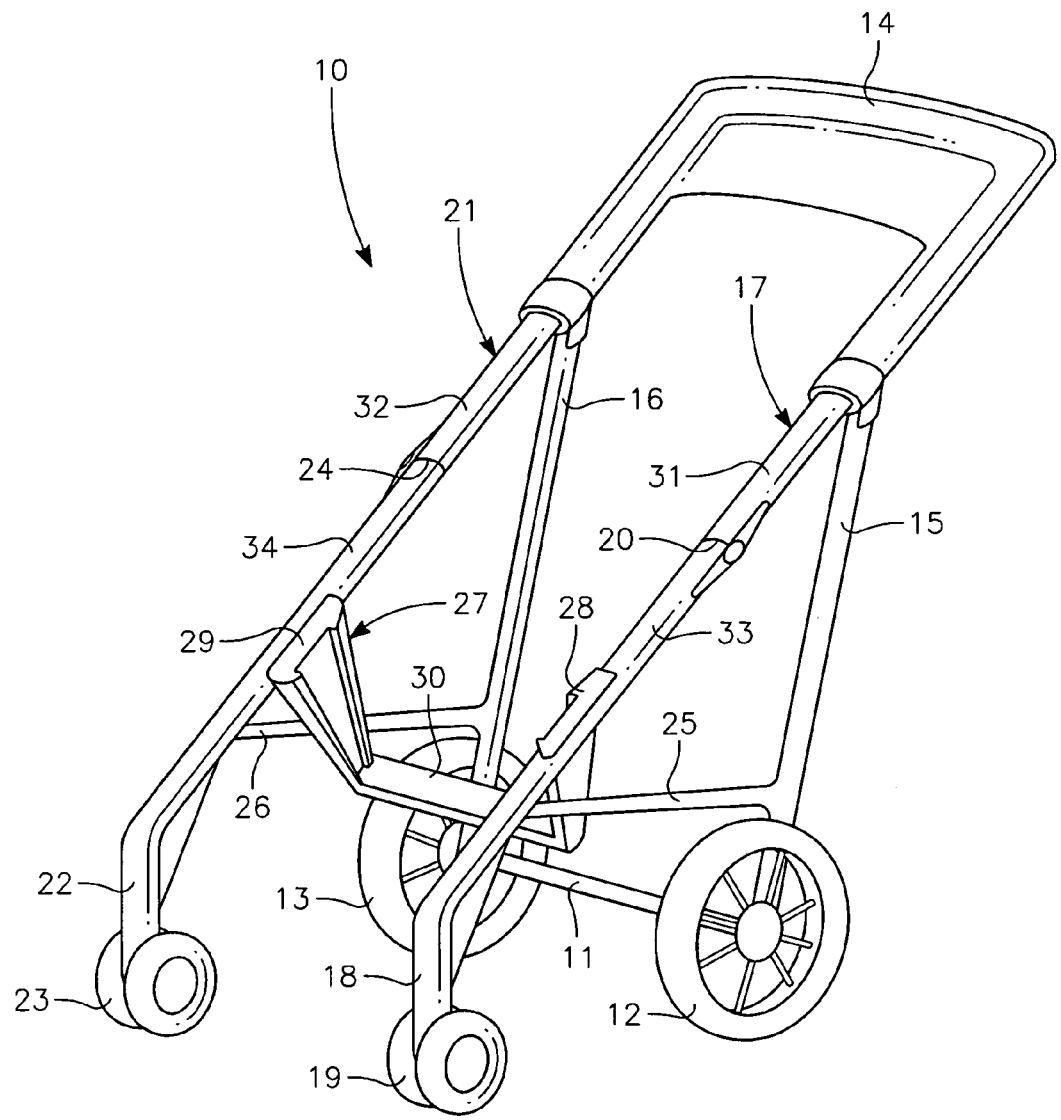
FIG. 1 is a perspective view of the invention skeleton
Figure 2:
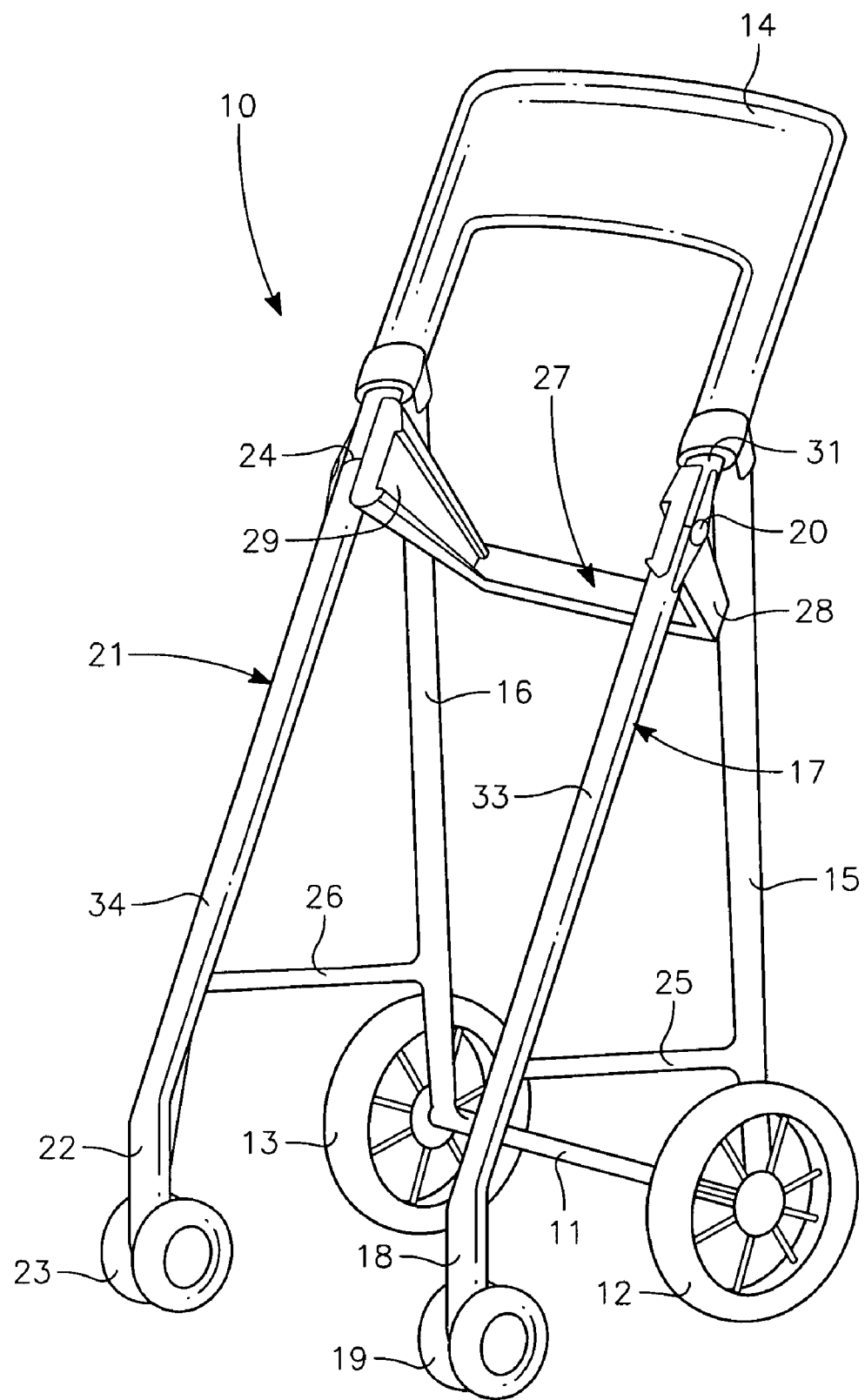
FIG. 2 is a perspective view of the invention with the attachment portion lifted high on the skeleton to receive a seat to be used as a high chair.
Figure 2A:
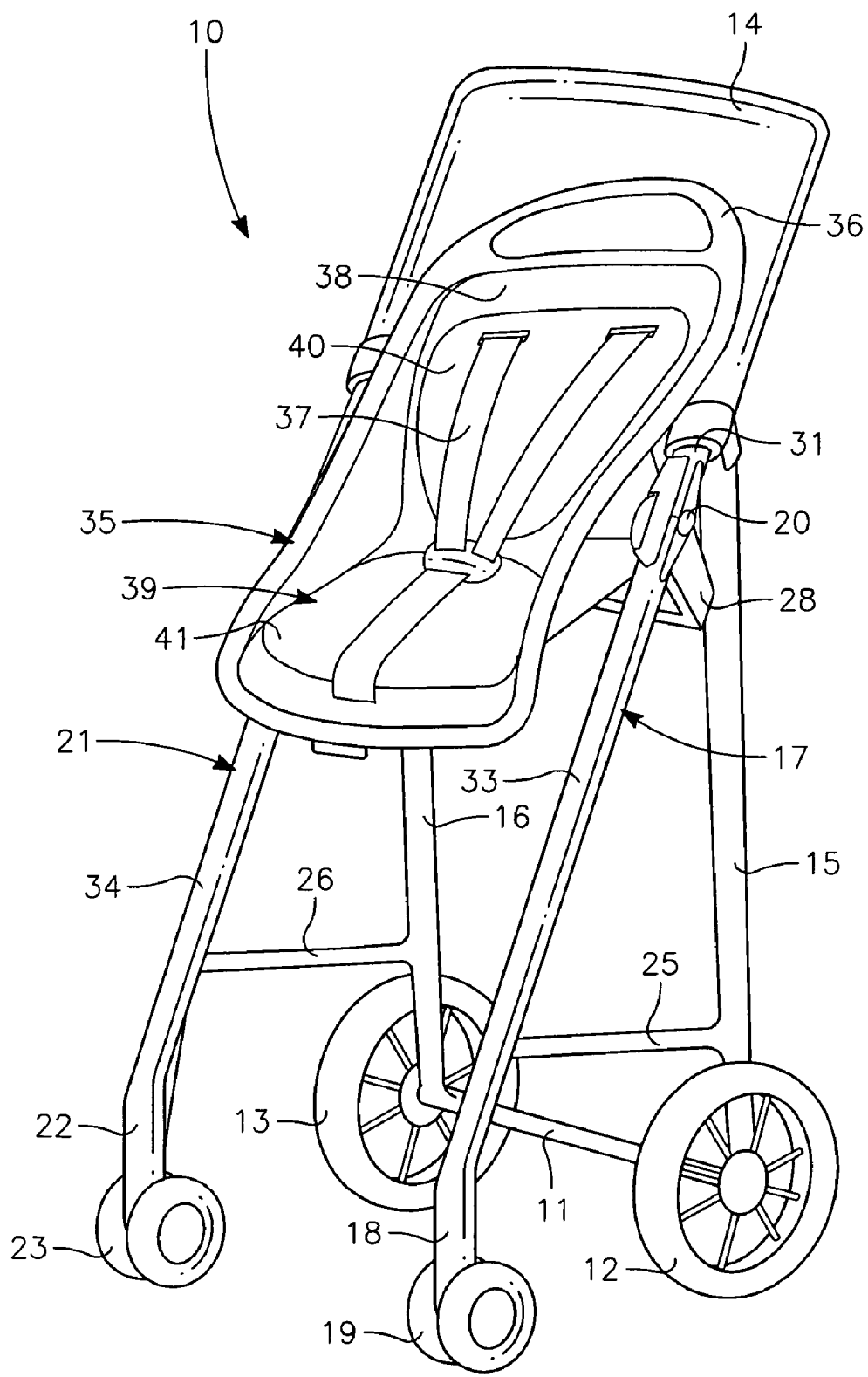
FIG. 2A is a perspective view of the invention with the infant seat attached to the skeleton in a high position for use as a high chair.
Figure 3:
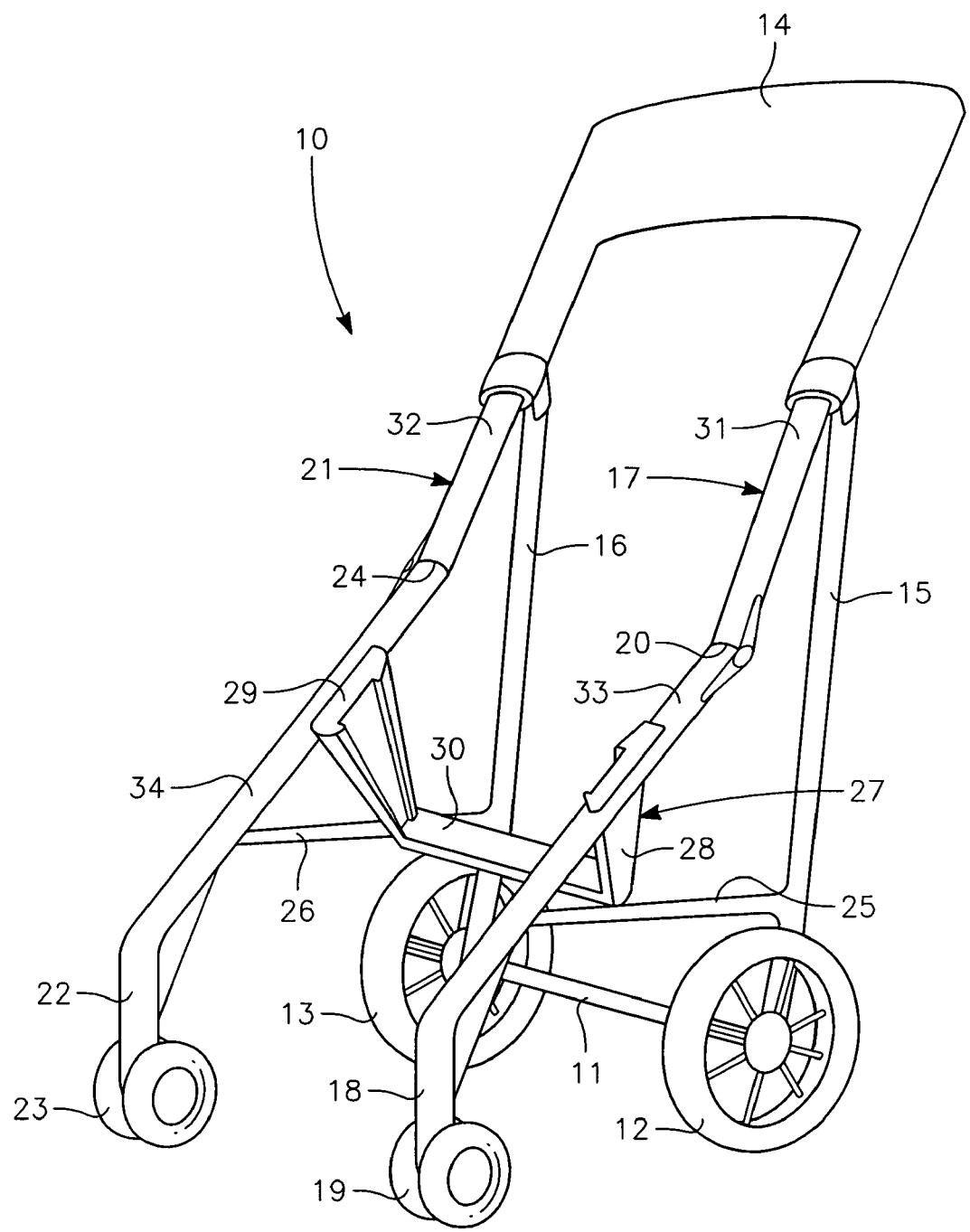
FIG. 3 is a perspective view of the invention is it begins to be moved into its portable collapsed position.
Figure 4:
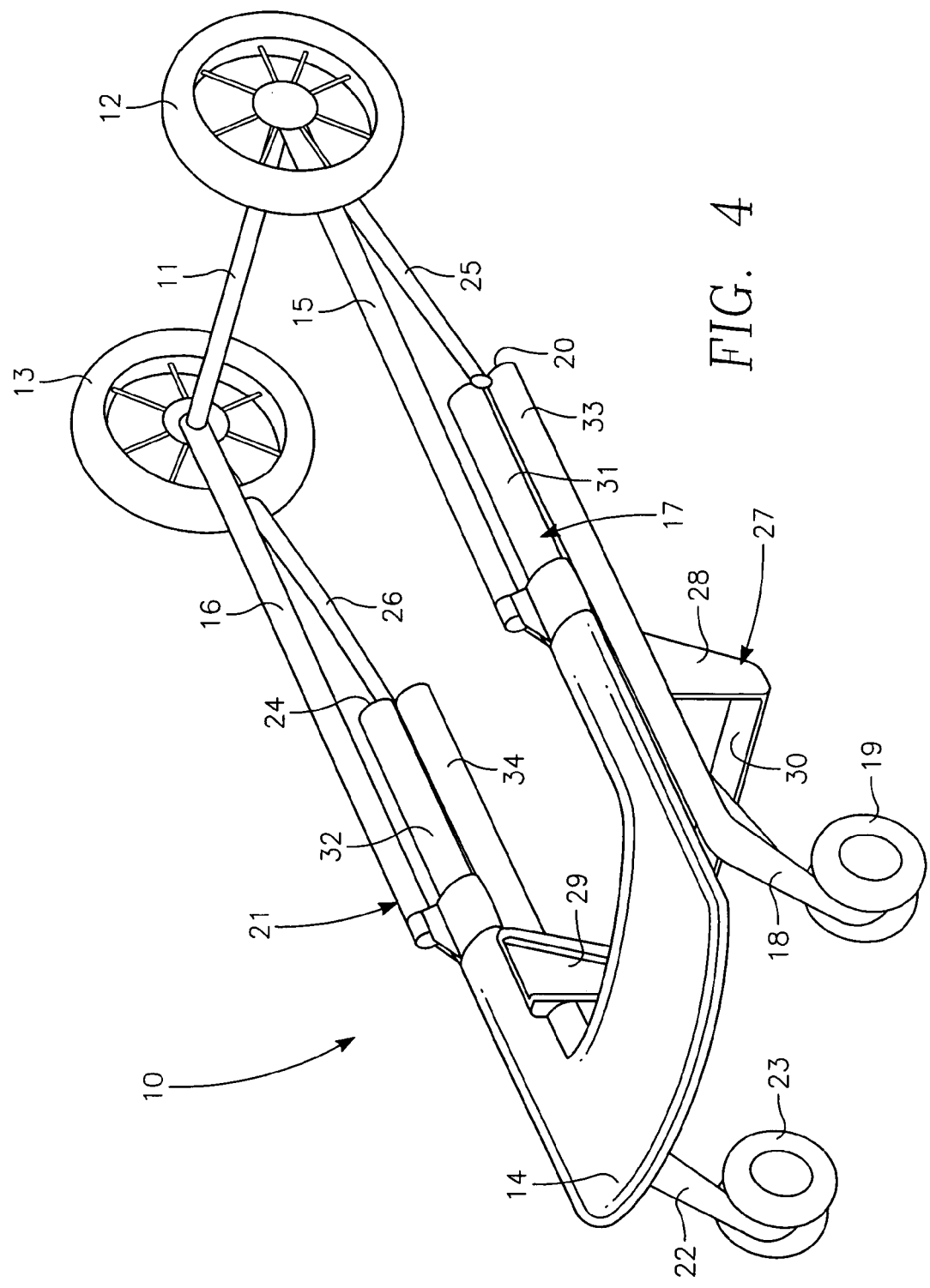
FIG. 4 is a perspective view of the invention in its collapsed position.

A list of the numerical designations and part they refer to includes:

10 device
11 rear support bar
12 first wheel on rear support bar
13 second wheel on rear support bar
14 handle
15 first rear bar
16 second rear bar
17 first front bar
18 bottom portion of first front bar
19 third wheel on first front bar
20 collapsible joint in first front bar
21 second front bar
22 bottom portion of second front bar
23 fourth wheel on second front bar
24 collapsible joint on second front bar
25 first side support bar
26 second side support bar
27 central receiving piece
28 first side of central receiving piece
29 second side of central receiving piece
30 bottom portion of central receiving piece
31 portion of the first front bar between the collapsible joint and the handle
32 portion of the second front bar between the collapsible joint and the handle
33 portion of the first front bar between the collapsible joint and the bottom portion of the first front bar
34 portion of the second front bar between the collapsible joint and the bottom portion of the second front bar
35 infant seat
36 outer frame of the infant seat
37 securing means of the infant seat
38 back rest on infant seat
39 seat on infant seat
40 cushioning means on the back rest of the infant seat
41 cushioning means on the seat of the infant seat
42 carrying handle on infant seat
43 backpack
44 attaching means on backpack
45 straps on backpack
46 padding between straps and attaching means on backpack
47 first opening in seat
48 second opening in seat
49 adjustable subframe for skeleton
50 outside frame on subframe
51 first side attachment on subframe
52 second side attachment on subframe
53 bassinet
54 first attachment means on backpack
55 second attachment means on backpack We turn now to the drawings for further clarification of the invention. The skeleton of the device 10 is outlined in FIGS. 1, 2, 3 and 4. The skeleton is collapsible for ease of transport and storage. The collapsibility of the device 10 is illustrated in FIGS. 3 and 4. In FIG. 1 the device 10 is in position to receive optional parts. In FIG. 2 the device has the central receiving piece 27 in an elevated position and the rear bars 15, 16 moved forward and attached to the front bars 17, 21 at a lowered position, thereby reducing the angle of the skeleton 10 for ease of use as a high chair. In FIG. 3 the collapsible joints 20, 24 are depressed and the first front bar 17 and the second front bar 21 are collapsing to ultimately be put in the collapsed position illustrated in FIG. 4.

The skeleton of the device 10 is comprised of a horizontal rear support bar 11 that connects a first wheel 12 and a second wheel 13. A first rear bar 15 and a second rear bar 16 are perpendicularly attached to the rear support bar 11, both rear bars 15, 16 being substantially vertical in position and substantially parallel to each other, each terminating in the handle 14. A first front bar 17 and a second front bar 21 extend from the handle 14 in a substantially angular orientation terminating in corresponding bottom portions 18, 22. The front bars 17, 21 are substantially parallel to each other. The corresponding bottom portions 18, 22 of the front bars 17, 21 are in a substantially vertical position and are parallel to each other.

The bottom portions 18, 22 of the front bars 17, 21 each terminate in a wheel 19, 23. Collapsible joints 20, 24 are located substantially midway down the front bars 17, 21. When the device 10 collapses, the top portions 31, 32 of the front bars that are located between the handle 14 and the collapsible joints 20, 24 fold down to lay flush with the bottom portions 33, 34 of the front bars 17, 21 located between the collapsible joints 20, 24 and the bottom portions 18, 22.

Between the front bars 17, 21 and the rear bars 15, 16 are a pair of side support bars 25, 26. A central receiving piece 27 is located between the front bars 17, 21. The central receiving piece 27 receives optional attachments for the use of the device 10. The central receiving piece 27 has a first side 28, a second side 29 and a bottom portion 30. The first and second sides 28, 29 are substantially parallel to each other and each side 28, 29 is connected to a corresponding front bar 17, 21. The bottom portion 30 is perpendicular to both sides 28, 29.

Figure 1A:
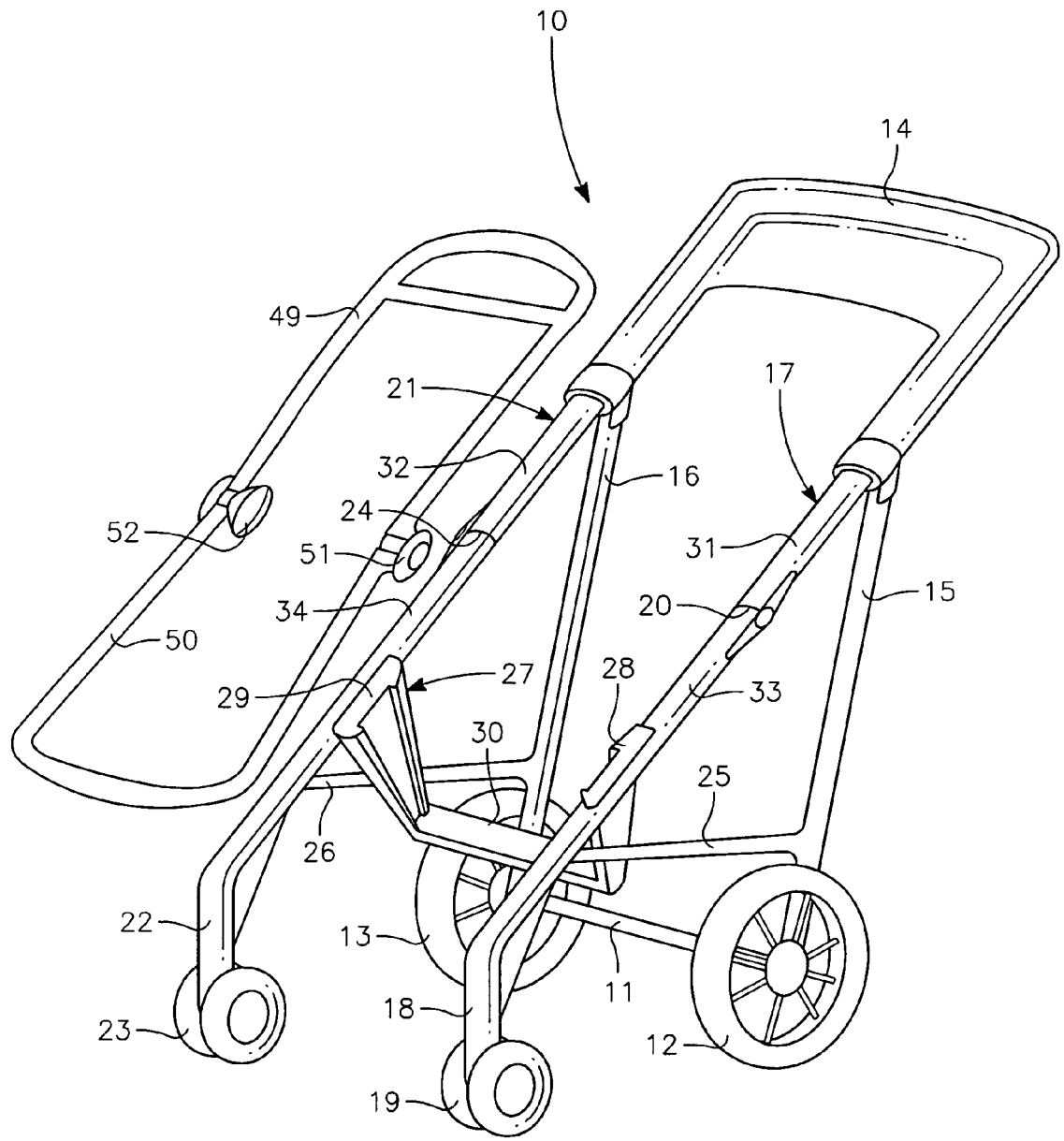
FIG. 1A is a perspective view of the invention skeleton with the subframe added to allow the skeleton to hold a bassinet.
Figure 1B:
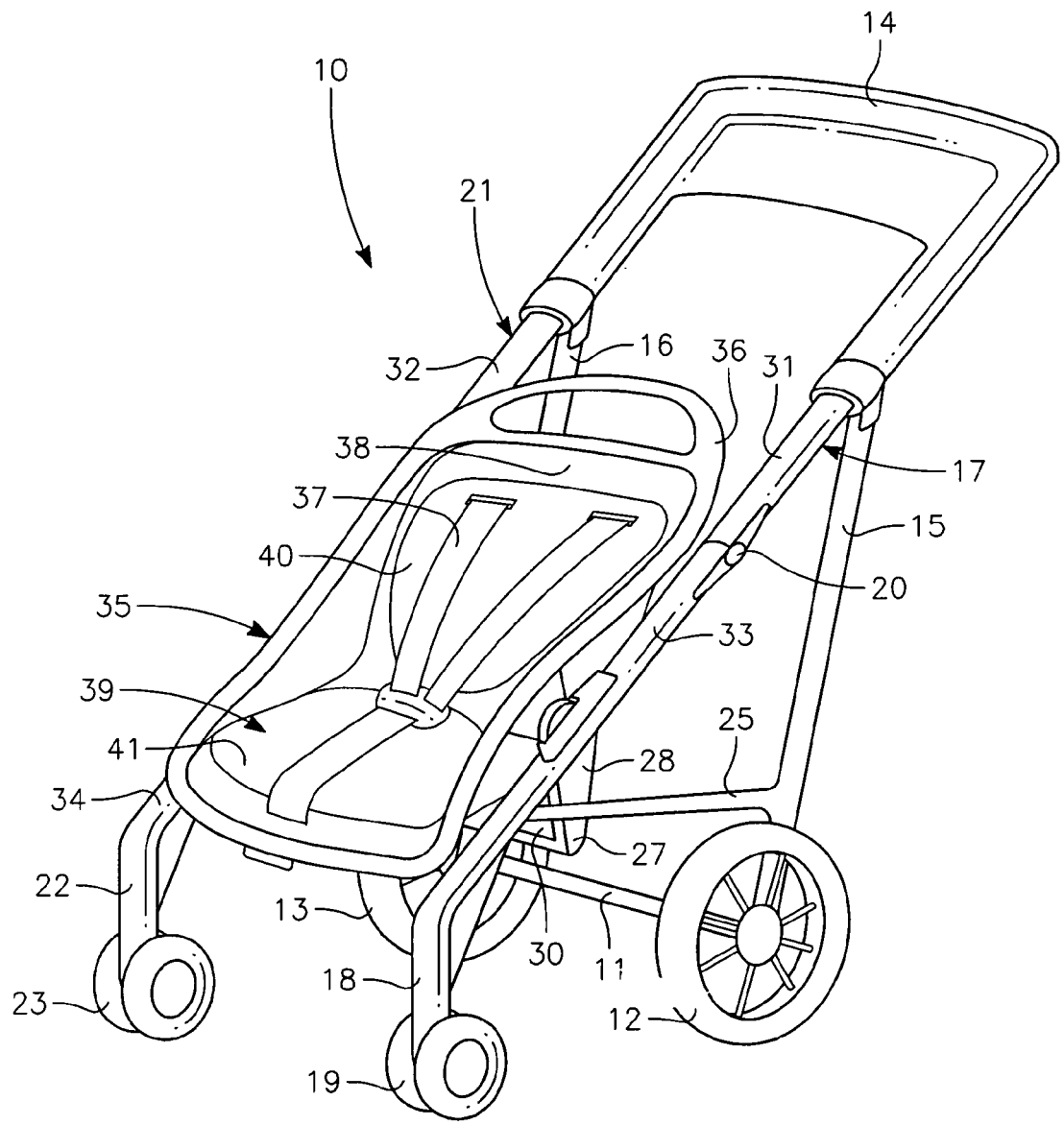
FIG. 1B is a perspective view of the invention with an infant seat attached.

FIG. 1B shows the skeleton of the device 10 receiving an infant seat 35 in the central receiving piece 27. The infant seat 35 has an outer frame 36, a securing means 37, a backrest, 38, a seat portion 39, a first cushioning means 40 on the backrest 38 and a second cushioning means 41 for the seat portion 39. FIG. 1D shows the seat 35 with an optional carrying handle 42 so that the seat 35 can be removed from the skeleton of the device 10 and used as a baby carrier. The central receiving pieces 28, 29 attach to a first and second attachment means 54, 55 found on the backpack 43. When utilized this way, the infant seat 35 is carried by hand.

Figure 1C:
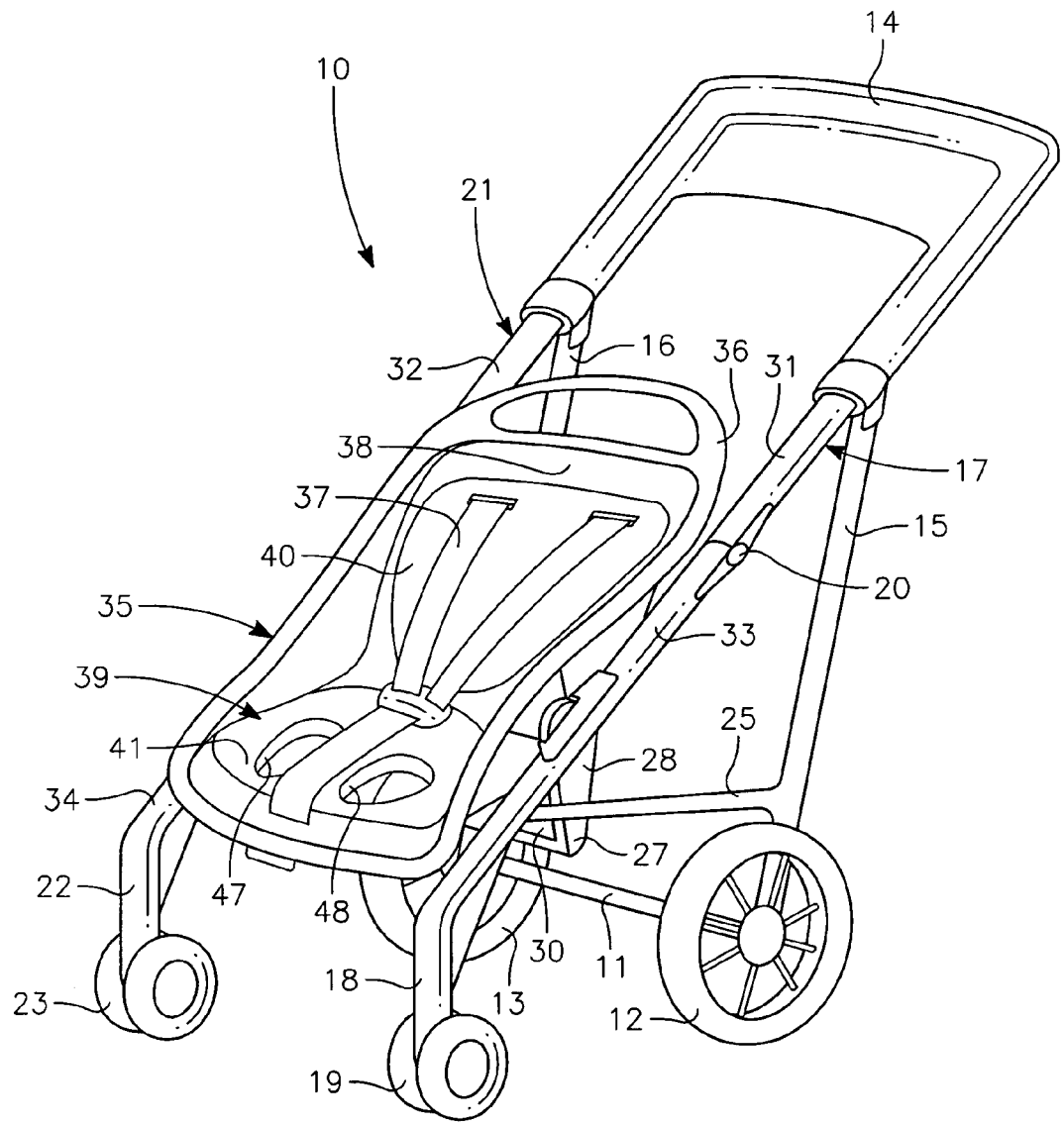
FIG. 1C is a perspective view of the invention with a seat attached that is modified to be used as a walker.
Figure 1D:
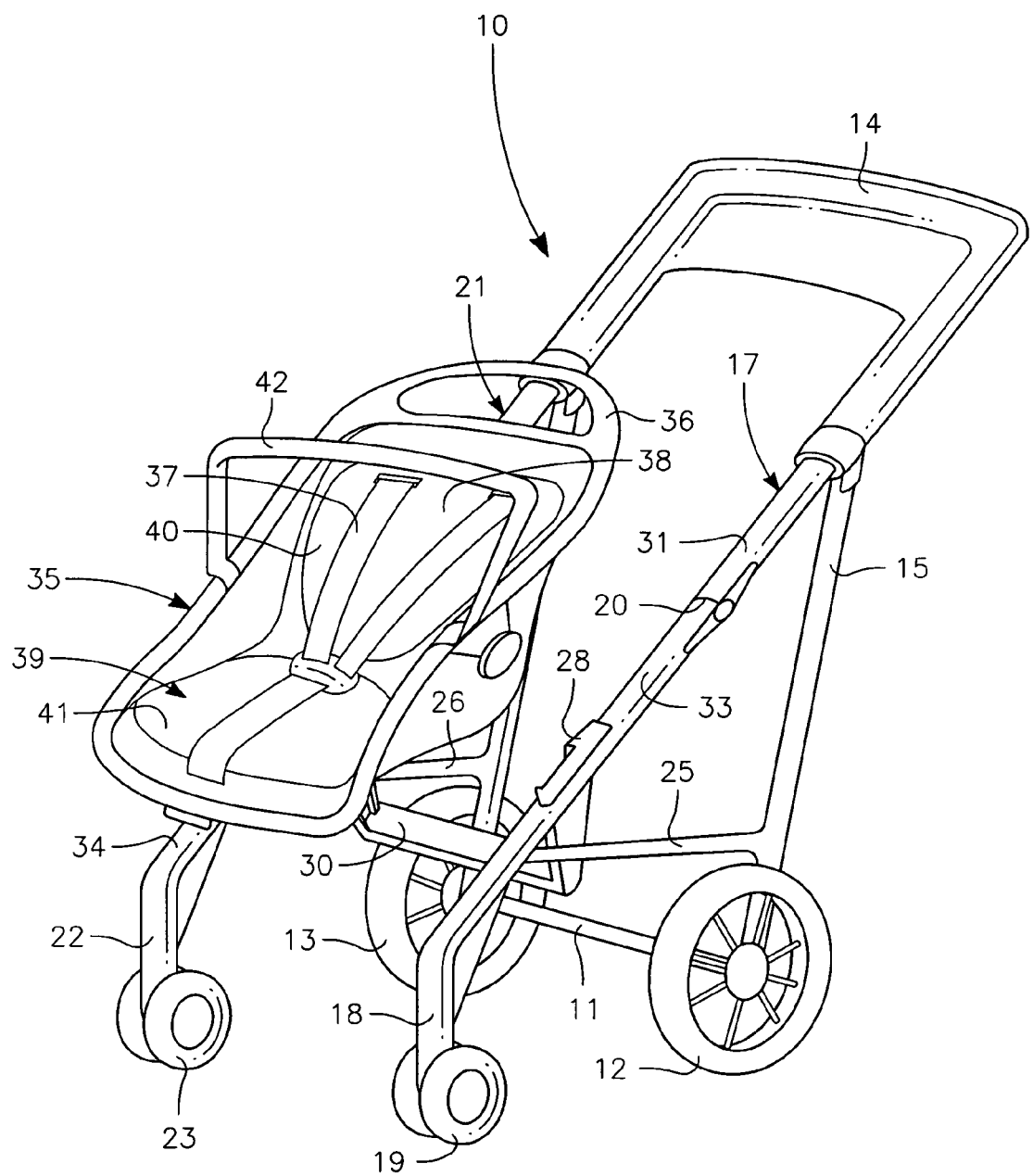
FIG. 1D is a perspective view of the invention with a removable seat that can be used as a baby carrier.
Figure 1E:
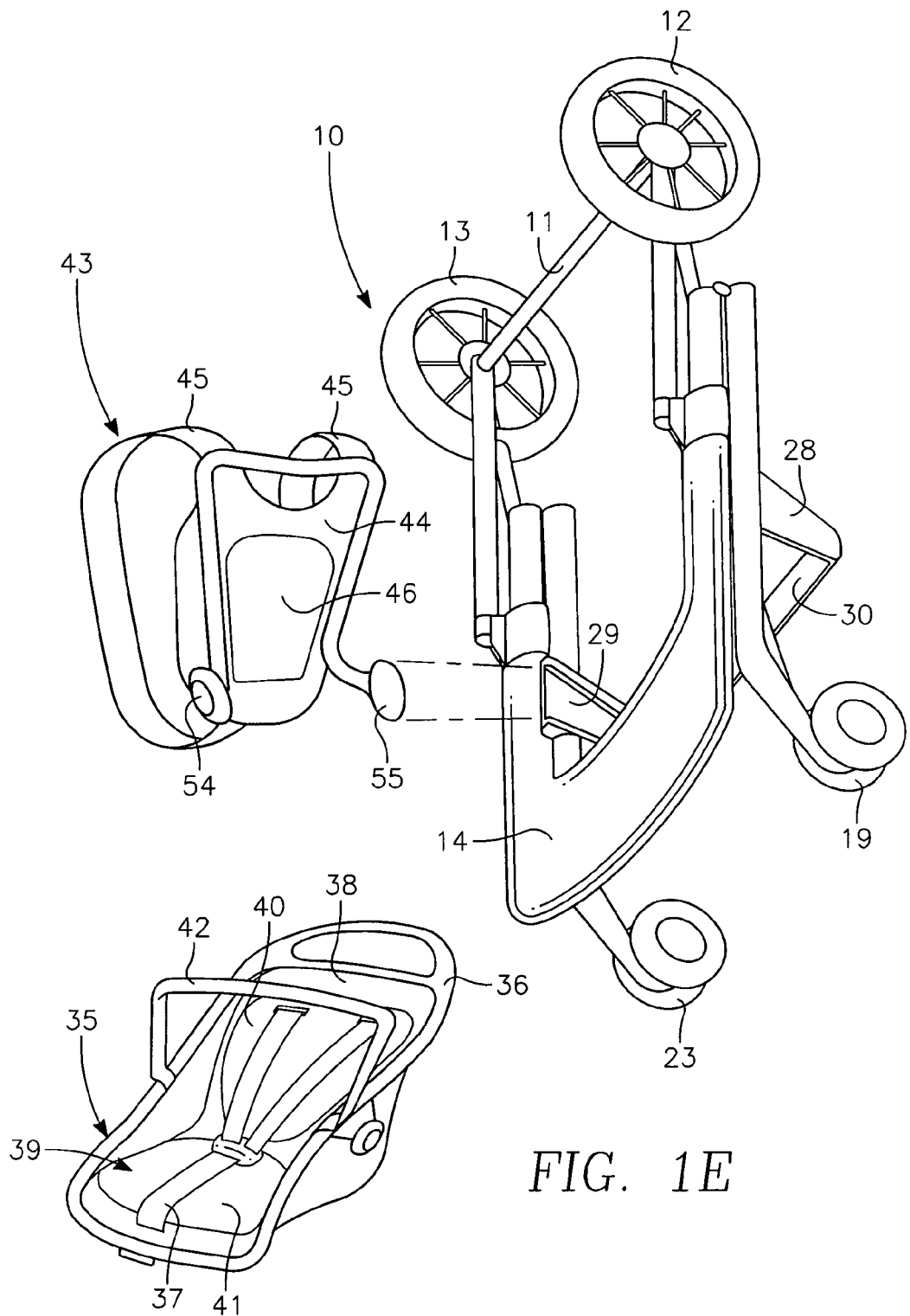
FIG. 1E is a perspective exploded view of the invention with the infant seat removed from the frame with the frame then being convertible into a backpack when the frame is in its collapsed position and the infant seat is carried by hand.
Figure 1F:
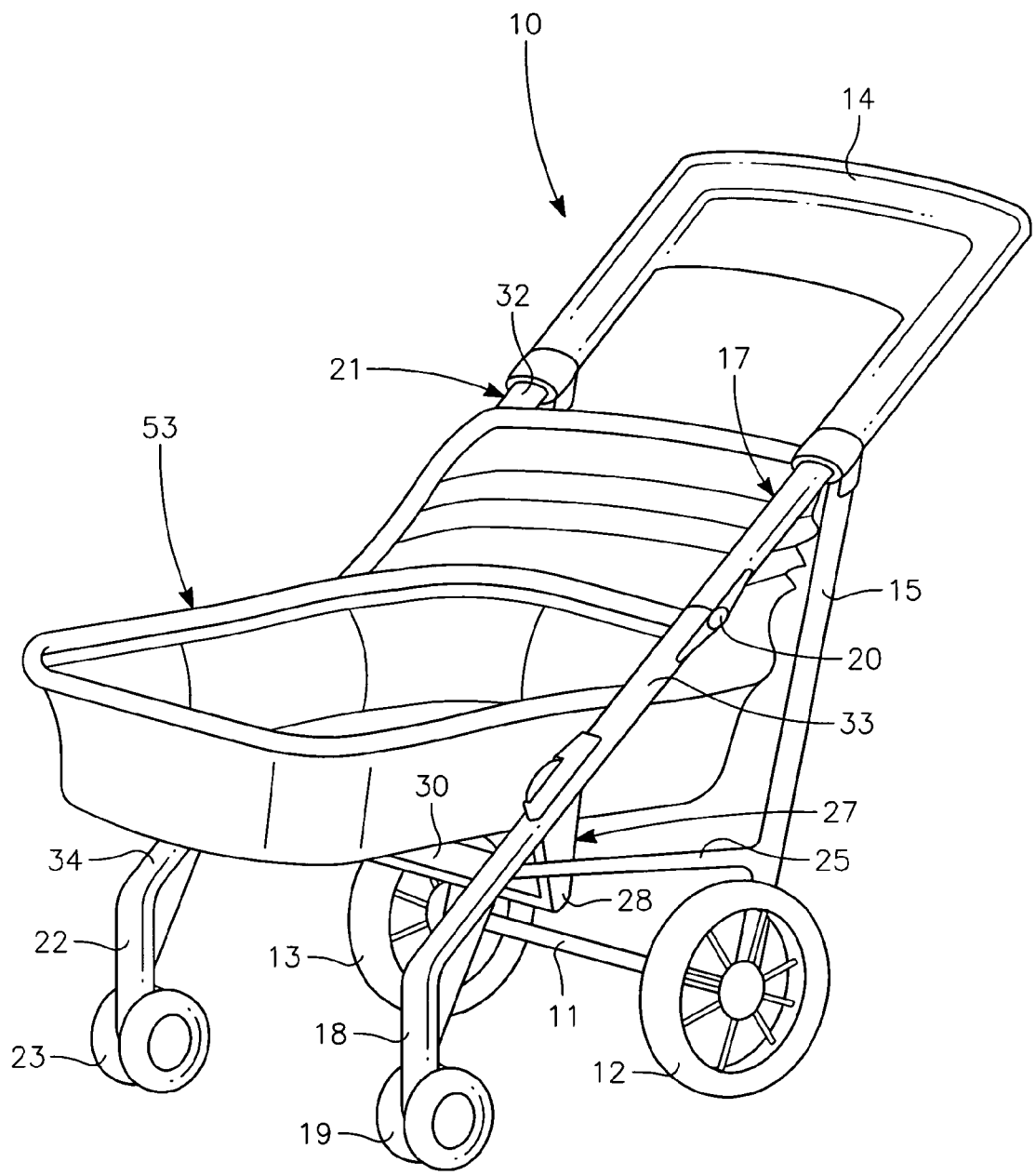
FIG. 1F is a perspective view of the invention with a bassinet attached to the skeleton.
Figure 1G:
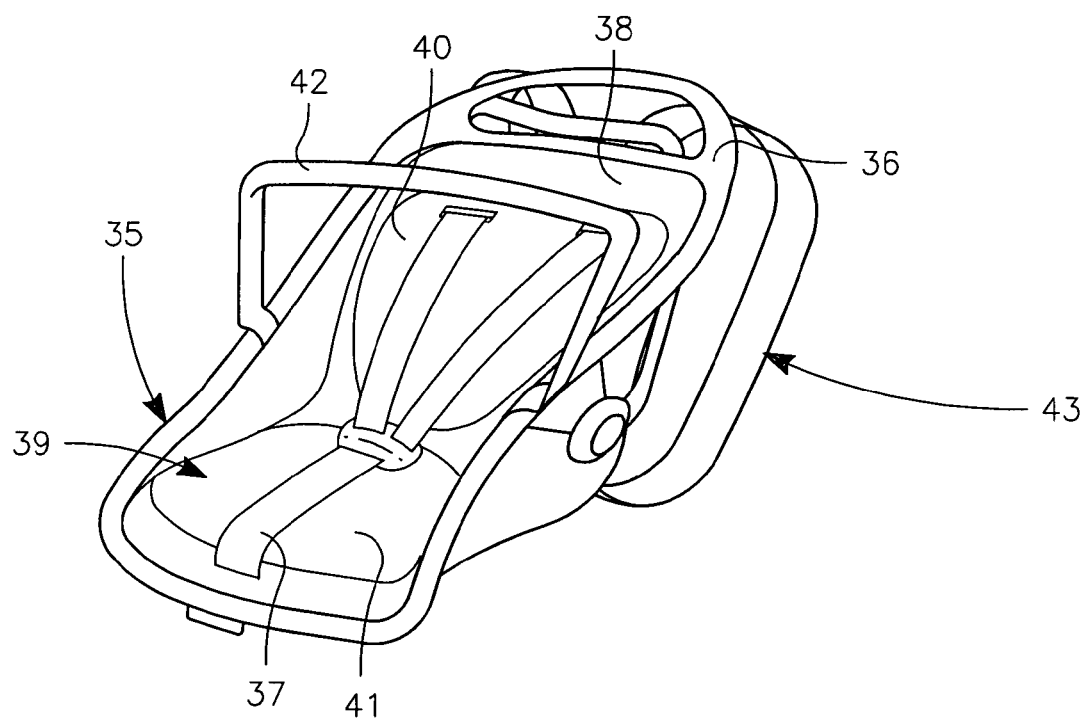
FIG. 1G is a perspective view of the invention wherein the backpack carries the infant seat and the collapsed skeleton is stored elsewhere.

Alternatively, as shown in FIG. 1G, the infant seat 35 is attachable to the backpack 43 at the attachment means 54, 55 to the infant seat 35. When utilized in this manner, the skeleton of the device 10 is either carried by hand or stored in a convenient location for future use.

In FIG. 1C the infant seat is modified for use as a walker. In the seat 39 portion of the infant seat 35 are two openings 47, 48 for the child's feet to dangle below the seat 35 and reach the floor for use in walking around. FIG. 1E shows how the infant seat 35 can be removed from the skeleton of the device 10 attached to the backpack 43. The backpack 43 has an attaching means 44 for attachment to the back of an adult, a pair of straps 45 and a soft padding material 46 located between the straps 45 and the attachment means 44 on the backpack 43. The collapsed skeleton 10 is then carried on an adult's back and the infant seat 35 is carried by hand.

FIG. 1A shows the adjustable subframe 49 that can be added to the skeleton of the device 10. The subframe 49 has and outside frame 50, a first side attachment means 51 and a second side attachment means 52. Once received by the central receiving piece 37, the subframe 49 can then receive a bassinet 53 as illustrated in FIG. 1F.

Not shown in the drawings, but another aspect of the invention is the fact that an infant car seat, produced by a third party manufacturer, can be attached to the central receiving piece 27 with modifications made to the device 10 as necessary.

The illustrations and examples provided herein are for explanatory purposes and are not intended to limit the scope of the appended claims. This disclosure is to be considered an exemplification of the principles of the invention and is not intended to limit the spirit and scope of the invention and/or claims of the embodiment illustrated. Those skilled in the art will make modifications to the invention for particular applications of the invention.

What is claimed is:

1. A multi-purpose collapsible infant device comprising
   a horizontal rear support member connecting a first wheel and a second wheel;
   a handle;
   a first rear member extending downward in a substantially vertical orientation from said handle and attaching to said rear support member;
   a second rear member extending downward in a substantially vertical orientation from said handle and attaching to said rear support member wherein said second rear member is substantially parallel to said first rear member;
   a first front member extending downward at an angled orientation from said handle and having a bottom portion that bends to a position substantially perpendicular to the ground, said bottom portion of said first front member being attached to a third wheel, said first front member having a collapsible joint located between said handle and said bottom portion;
   a second front member extending downward at an angled orientation from said handle and having a bottom portion that bends to a position substantially perpendicular to the ground, said bottom portion of said second front member being attached to a fourth wheel, said second side member having a collapsible joint located between said handle and said bottom portion, said second front member being substantially parallel to said first front member;
   a first side support member positioned substantially parallel to the ground that connects said first rear member to said first front member;
   a second side support member positioned substantially parallel to the ground that connects said second rear member to said second front member;
   a central receiving piece that releasably receives optional attachments, said central receiving piece having a first side and a second side, said first side and said second sides being connected through a bottom portion, said first side and said second side positioned substantially perpendicular to said bottom portion, said central receiving piece being movable in an up and down direction along said first front member and said second front member;
   wherein said infant device is foldable at said collapsible joints on said first front member and said second front member to a position wherein said portion of said first front member between said collapsible joint on said first front member and said handle and said portion of said second front member between said collapsible joint on said second front member and said handle lay flush against said portion of said first front member between said collapsible joint on said first front member and said bottom portion of said first front member and said portion of said second front member between said collapsible joint on said second front member and said bottom portion of said second front member.

2. A device according to claim 1 wherein a latch secures said device when in a collapsed position, said latch being located near said handle.

3. A device according to claim 1 wherein said central receiving piece securely holds in place an infant seat, said infant seat further comprising an outer frame that releasably fits into said central receiving piece;
a securing means to secure an infant in said infant seat;
a back rest;
a seat;
a cushioning means on said back rest;
a cushioning means on said seat.

4. A device according to claim 3 wherein said infant seat has a carrying handle, thereby allowing said infant seat to be used as an infant carrier when removed from said central receiving piece.

5. A device according to claim 4 wherein said device is converted into a backpack wherein said infant carrier is removed from said device for carrying, said backpack further comprising an attaching means for attachment to said frame of said device, said device being in a collapsed position;
adjustable straps that are attached to said attaching means;
a soft padding material placed between said adjustable straps and said attaching means.

6. A device according to claim 5 wherein said backpack carries said infant carrier rather than said collapsed device.

7. A device according to claim 3 wherein said cushioning means on said infant seat is modifiable to reveal a first opening and second opening for the legs of the infant to enter thereby utilizing said device as a walker.

8. A device according to claim 1 wherein an adjustable subframe is securely attached to said central receiving piece, said subframe further comprising a substantially rectangular outside frame;
a first side attachment means for attachment to said first side of said central receiving piece;
a second attachment means for attachment to said second side of said central receiving piece.

9. A device according to claim 7 wherein a bassinet is securely attachable to said subframe.

10. A device according to claim 3 wherein said first rear member and said second rear member are movable to attach to said first front member and said second front member at a position that places said device at a reduced angle relative to the ground wherein said infant seat can be positioned to provide a preferred angle to be used as a high chair.

* * * * *